US008015890B2

(12) United States Patent
Christensen et al.

(10) Patent No.: US 8,015,890 B2
(45) Date of Patent: Sep. 13, 2011

(54) LINEAR ACTUATOR

(75) Inventors: Bruno Christensen, Nordborg (DK); Finn Jacobsen, Nordborg (DK); Kjeld Kristiansen, Sønderborg (DK)

(73) Assignee: Linak A/S, Nordborg (DK)

( * ) Notice: Subject to any disclaimer, the term of this patent is extended or adjusted under 35 U.S.C. 154(b) by 29 days.

(21) Appl. No.: 10/590,511

(22) PCT Filed: Feb. 24, 2005

(86) PCT No.: PCT/DK2005/000122
§ 371 (c)(1),
(2), (4) Date: Aug. 24, 2006

(87) PCT Pub. No.: WO2005/079134
PCT Pub. Date: Sep. 1, 2005

(65) Prior Publication Data
US 2007/0169578 A1    Jul. 26, 2007

(30) Foreign Application Priority Data
Feb. 24, 2004   (DK) .................................. 2004 00292

(51) Int. Cl.
*F16H 25/22*    (2006.01)
(52) U.S. Cl. ..... 74/89.38; 74/89.23; 475/263; 192/56.62
(58) Field of Classification Search ............... 74/89.33, 74/89.37–89.39, 424.72, 89.23; 192/56.62; 475/43, 263, 293; 81/467
See application file for complete search history.

(56) References Cited

U.S. PATENT DOCUMENTS

| 2,465,601 | A | * | 3/1949 | Ochtman | ............................ 477/9 |
| 2,479,019 | A | * | 8/1949 | Ochtman | ...................... 74/89.42 |
| 2,531,109 | A |   | 11/1950 | Chapman | |
| 2,690,685 | A | * | 10/1954 | Donandt | ........................ 475/335 |
| 3,240,304 | A | * | 3/1966 | Wickersham | ............... 192/56.42 |
| 3,646,375 | A | * | 2/1972 | Mader | ............................... 310/83 |
| 3,693,759 | A | * | 9/1972 | Schindel | ...................... 185/40 R |
| 3,756,095 | A | * | 9/1973 | McCay et al. | ................. 475/346 |
| 4,528,470 | A | * | 7/1985 | Young et al. | ..................... 310/78 |
| 4,548,305 | A | * | 10/1985 | Anderson | ................... 192/56.54 |
| 4,614,134 | A | * | 9/1986 | Bohle | ........................... 475/125 |
| 4,635,904 | A | * | 1/1987 | Whittingham | ................ 254/425 |
| 4,712,441 | A | * | 12/1987 | Abraham | ...................... 74/89.38 |
| 4,846,011 | A |   | 7/1989 | Gaffney | |
| 5,195,721 | A | * | 3/1993 | Akkerman | ............... 251/129.13 |
| 5,472,383 | A | * | 12/1995 | McKibbin | ...................... 475/159 |
| 6,202,803 | B1 |   | 3/2001 | Lang | |
| 6,240,797 | B1 | * | 6/2001 | Morishima et al. | ........... 74/89.39 |
| 6,259,175 | B1 | * | 7/2001 | Alfano et al. | .................... 310/20 |
| 6,332,518 | B1 |   | 12/2001 | Hinterlechner | |
| 6,682,454 | B2 | * | 1/2004 | Suzuki et al. | .................. 475/263 |

* cited by examiner

*Primary Examiner* — Richard W Ridley
*Assistant Examiner* — Thomas Diaz
(74) *Attorney, Agent, or Firm* — Dykema Gossett PLLC

(57) ABSTRACT

A linear actuator includes a reversible electric motor which drives a spindle via a reduction gear with several stages and an activation element connected with it, and an overload clutch in connection with the first stage or one of the first stages in the reduction gear. This is advantageous in terms of structure and load and greater flexibility is achieved in the construction of the structure.

10 Claims, 12 Drawing Sheets

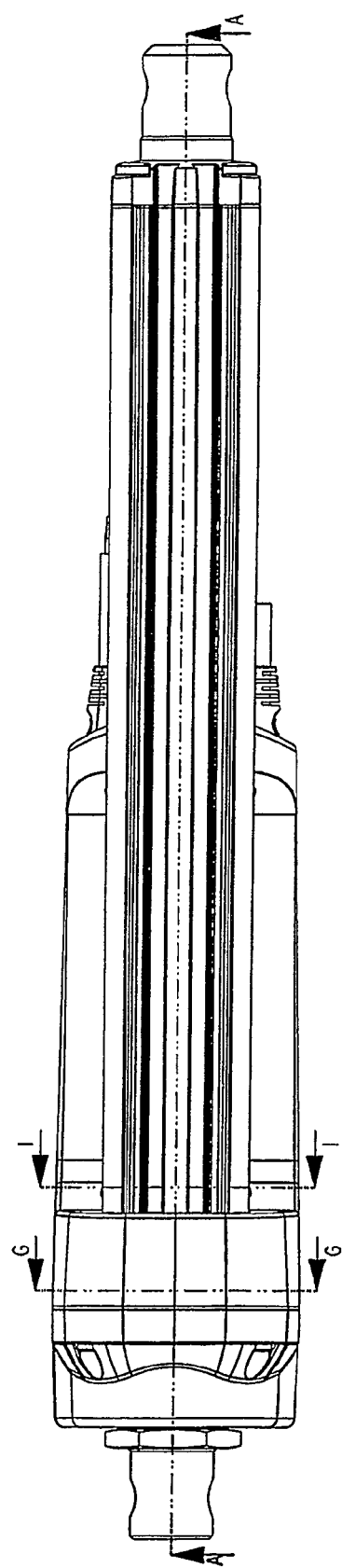
Fig. 8
6/11
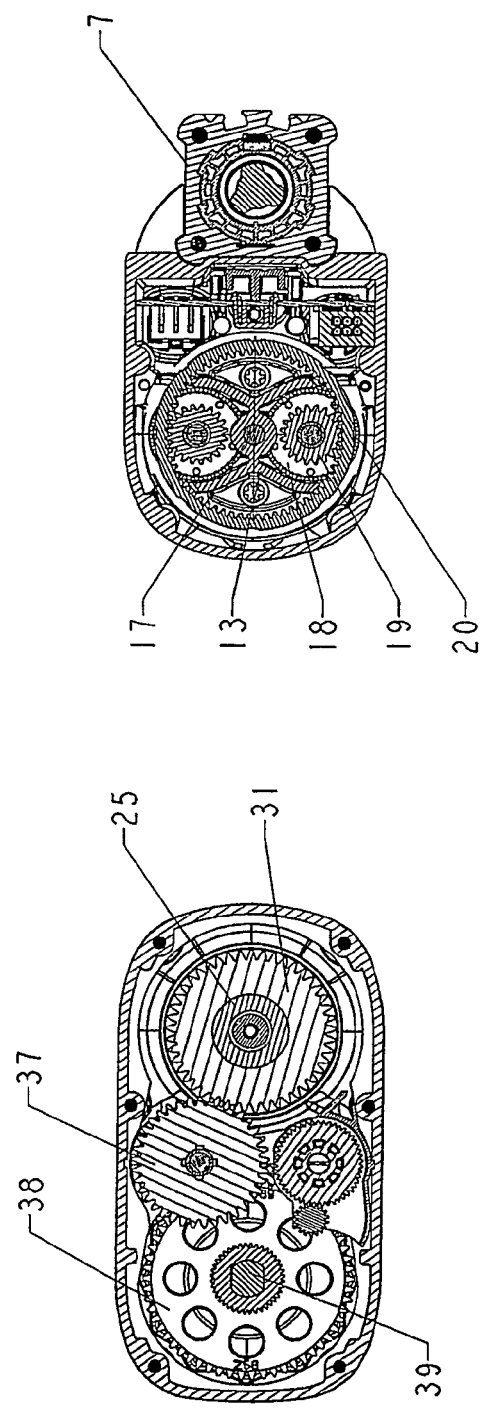
Fig. 10
Fig. 9

LINEAR ACTUATOR

BACKGROUND OF THE INVENTION

1. Field of the Invention

The present invention relates to a linear actuator.

2. The Prior Art

An actuator for industrial purposes of the above-mentioned type is marketed by the U.S. company Warner Electric Brake & Clutch Company under the trade mark ELECTRAC. The actuator is provided with an overload clutch in the form of a ball and ratchet clutch arranged between the spindle and the output side of the reduction gear. This position of the overload clutch also puts a limit on the speed of the actuator because of the high moment load on the clutch. The actuator has been marketed in an unchanged version at least for the last 30 years.

The object of the invention is to provide an actuator of this type with improved properties and greater flexibility in the building of the structure.

SUMMARY OF THE INVENTION

The actuator according to the invention is characterized in that the overload clutch is arranged in connection with the first stage or one of the first stages in the reduction gear, which means that the overload clutch is not subjected to so great moment loads, whereby it may be made more compact and reliable. The lower moment load also allows the speed of the actuator to be increased relative to the known structure by selecting spindles with greater pitches. With the same basic structure up to and including the overload clutch, the actuator may be adapted easily to customer-specific needs with various spindle units and subsequent gear stages. In extension of the transmission line from motor to overload clutch, it is possible to add, as desired, a brake for increasing the self-blocking capacity of the actuator, an adapter for a crank for driving the actuator manually in special situations, and other add-on features.

It should be mentioned for the sake of completeness that DE 103 27 736 A1 to Dewert Antriebs-und Systemtechnik GmbA & Co. KG and EP 1 101 571 A2 to Dana Corporation disclose an actuator for smaller loads with a ball and ratchet clutch. The spindle is driven here by a single worm gear where the clutch is incorporated in the side of the worm wheel and in engagement with the side of a cylinder member fixedly mounted on the spindle against the worm wheel. It should also be mentioned that it is known to provide a frictional clutch in the spindle nut itself, cf. U.S. Pat. No. 4,846,011 to Edward J. Faffney, but this is just for small actuators.

Owing to the smaller torque on the overload clutch because of its position in the structure, it is now easier to use other forms of clutches than just a ball and ratchet clutch. Generally, however, it is sill attractive to use a ball and ratchet clutch which is extremely sturdy. Pressing the cap down by a predetermined force and securing it so that the clutch appears as a unit ready for mounting in the actuator, ensure for one thing a unique overload moment, and for another allow easy testing of them prior to the mounting in the actuator. A finished unit also facilitates the mounting operation of the actuator considerably.

The transition to the subsequent stages in the gearing to the spindle is provided in a simple manner in that the ring with the balls is connected with a shaft member with a gear wheel. This also makes it easy to adapt these stages to customer-specific wishes.

To increase the self-blocking capacity of the actuator, the shaft member may be connected with a brake device, which may e.g., be formed by a screw spring and a claw clutch in engagement with the ends thereof.

In certain situations, it is desirable that the actuator may be driven manually. For this purpose, the shaft member or an extension thereof may be a device to receive a crank or the like through an opening in the cabinet. The actuator may hereby be driven with the crank.

A sturdy and simple fixing of the rear mount and a bearing for the spindle is achieved by a mounting element consisting of two parts mounted in a depression in the cabinet and secured by a nut screwed on to the part of the rear mount which protrudes through the cabinet. The mounting element may be polygonal so that that the rear mount may be set in a desired position.

As an industrial actuator is involved which may be severely loaded, a guide profile for the activation element, in addition to being secured with the end to the cabinet, may be attached additionally to the cabinet by two claws which grip down around the edge on the outer side of the guide profile. Thereby, the guide profile is secured in a simple manner against deflection.

When the electrical control of the actuator is incorporated in the cabinet, a compact structure is achieved, especially when the control is provided on a single printed circuit board which is arranged along the motor.

A particularly reliable and sturdy end stop concept with two end stop switches is achieved by a longitudinally movable element with two arms seated in a slot in a housing, said arms having interposed between them a single spring whose ends additionally engage a stop in the housing. The element is activated directly or indirectly by the spindle nut in the outer positions against the spring force. Use of just a spring, preferably biased, provides for a well-defined movement. When, additionally, the element is allowed to guide towards the outer side of the switches, an even more well-defined activation of the switches is achieved.

The position of the activation element is typically determined by Hall sensors, which are likewise provided on the printed circuit control board, but where an absolute positional determination is desired, it is possible to use a potentiometer constructed as an add-on unit in engagement with down gearing between the safety clutch and the spindle. The construction of the potentiometer as an add-on unit greatly simplifies the mounting without intervention in the rest of the structure.

Further features of the invention will appear from the following embodiment of the invention, which will be described more fully below with reference to the accompanying drawings.

BRIEF DESCRIPTION OF THE DRAWINGS

FIG. 8 shows the actuator seen directly from below, FIG. 9 shows a cross-section along the line G-G in FIG. 8, FIG. 10 shows a cross-section along the line 1-1 in FIG. 8.

DETAILED DESCRIPTION OF THE PREFERRED EMBODIMENT

Figure 1:
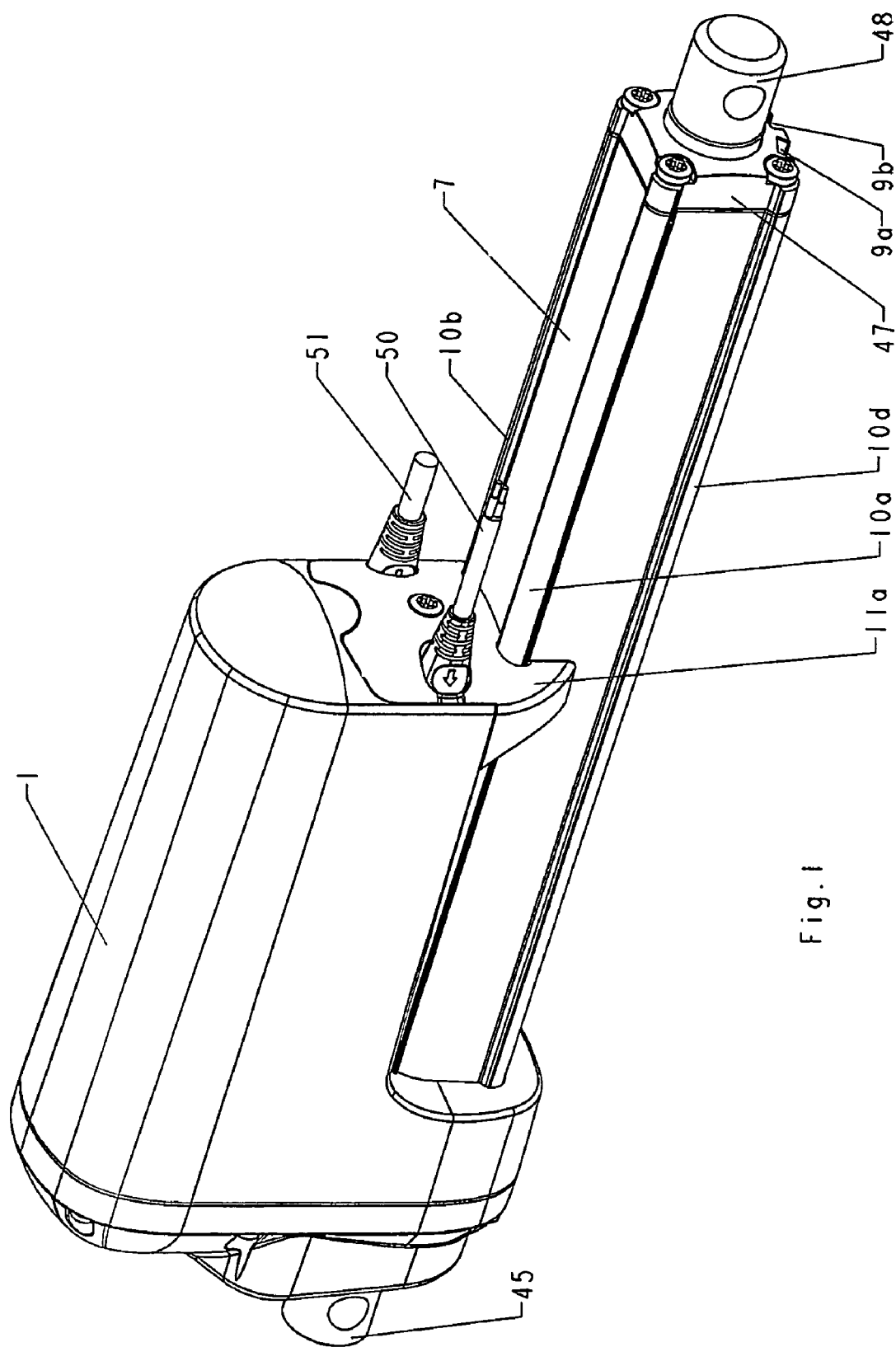
FIG. 1 shows the actuator seen in perspective from the front.

As will appear from the drawing (FIG. 4), the main components of the actuator are formed by a cabinet 1, a reversible electric motor 2, a reduction gear 3 with several stages, a spindle 4, a spindle nut 5, an activation element 6 in the form of a tubular piston, also called the inner pipe, a guide 7 therefor, also called the outer pipe, and finally a rear mount 8.

Figure 2:
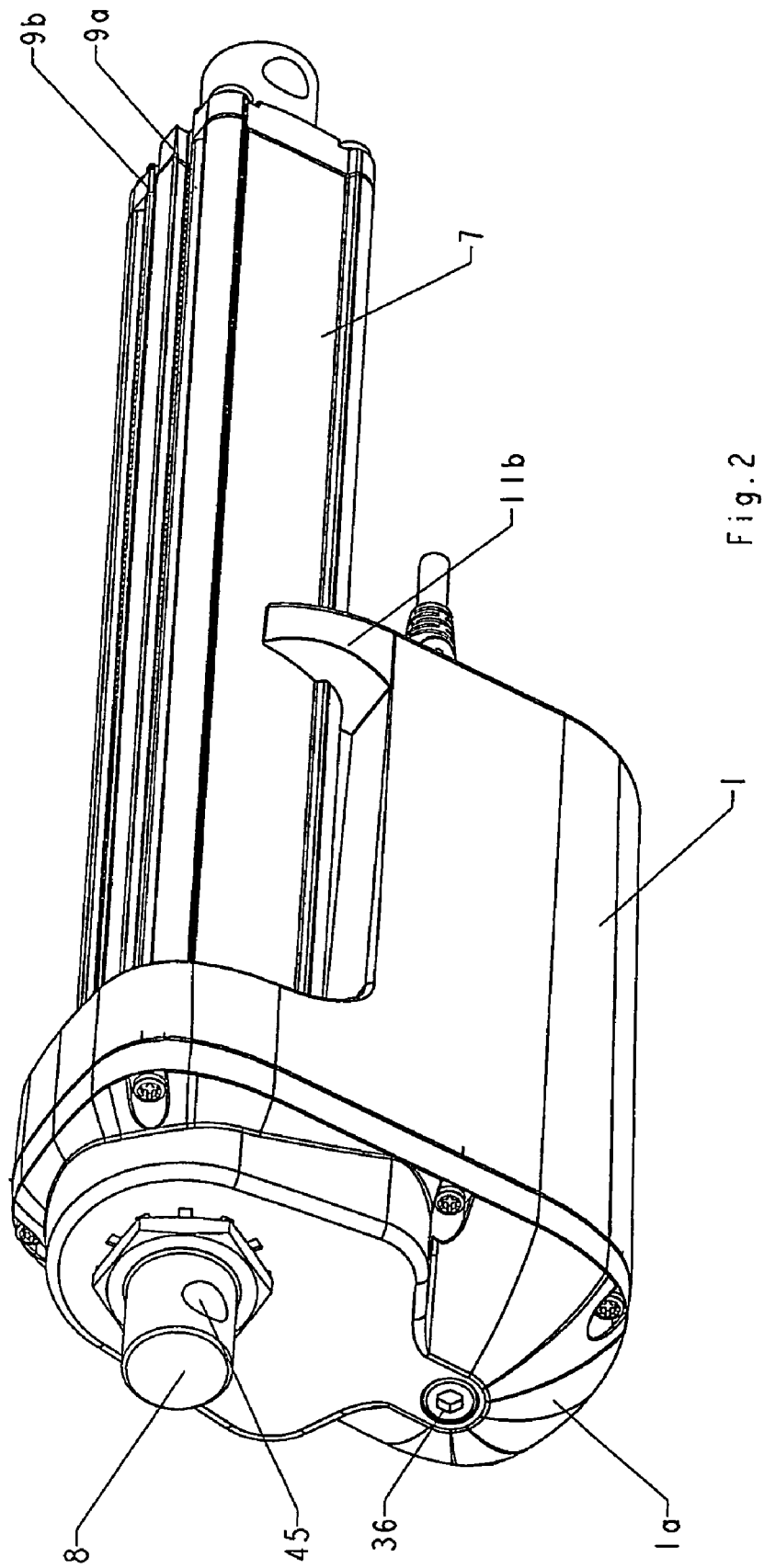
FIG. 2 shows the actuator seen in perspective from behind.

The cabinet 1, which is made of moulded aluminium for strength purposes, has an end cover 1a which is mounted with screws, and the joint is moreover water-tight (FIGS. 1 and 2). The outer pipe 7, which is an extruded aluminium pipe having an essentially square cross-section, is mounted with screws, and here, too, the joint is water-tight. On its one side, the outer pipe 7 is provided with two longitudinal grooves 9a, 9b, which may be used for the mounting of extra equipment. Further, the pipe 7 is extruded with a screw channel in each corner, which externally forms a longitudinal, projecting strip 10a-d having a cross-section similar to a segment of a circle. To secure the outer pipe, the outer pipe is pushed during the mounting with the two strips 10a, 10b into recesses, intended for the purpose, in the front end of the cabinet 1, which has two claw-like projections 11a, 11b which grip the strips 10a, 10b.

Figure 4:
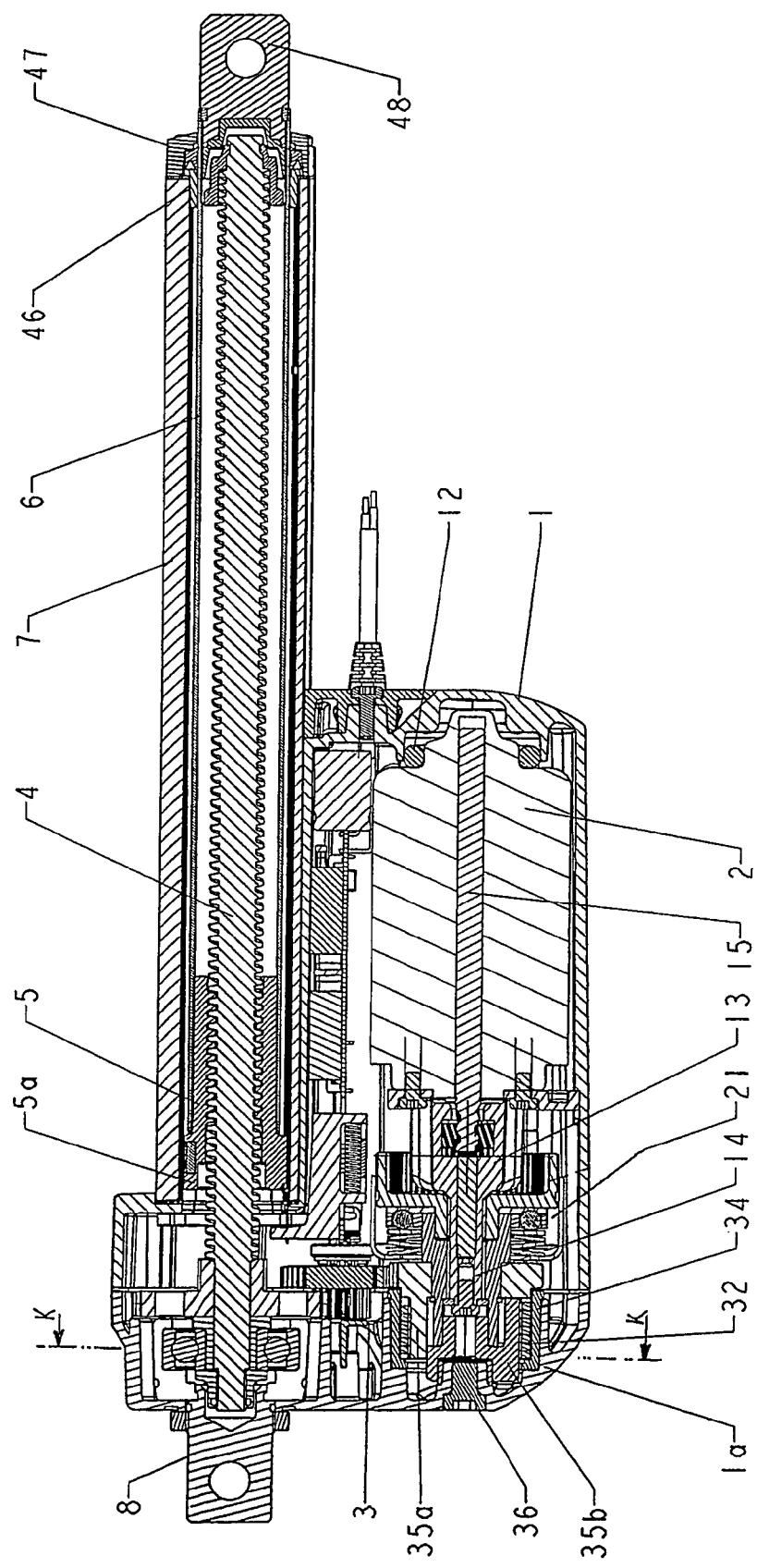
FIG. 4 shows a longitudinal section through the actuator.
Figure 19:
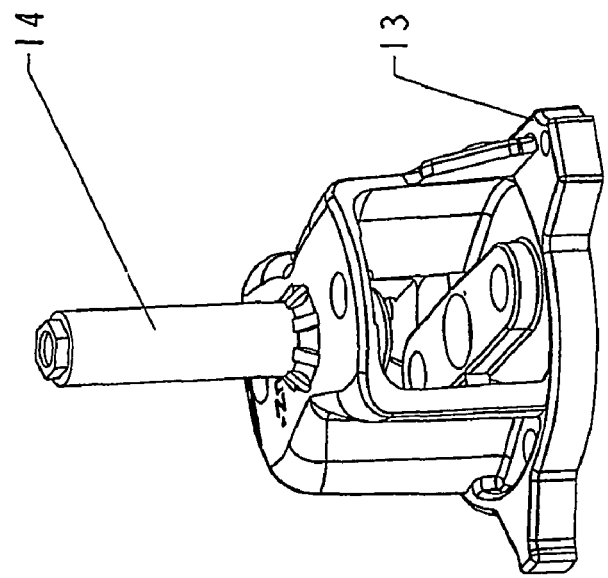
FIG. 19 shows a perspective view of a bracket on the front end of the motor.

The motor 2 is fixed in the cabinet in that a depression is provided internally in this to receive a rubber ring 12 on the rear end of the motor (FIG. 4). A specially configured bracket 13 (FIG. 19) having a central tubular shaft 14 positioned in extension of the motor shaft 15 is secured by two screws on the front end of the motor.

The first stage in the reduction gear is formed by a planetary gear. An extended end of the motor shaft is configured as a sun wheel 17 in engagement with a pair of obliquely toothed gear wheels 18 positioned diametrically opposite (FIG. 10). A planetary wheel 19 in engagement with an orbital wheel 20 is moulded integrally with each gear wheel 18.

The orbital wheel, which is bell-shaped with a central opening, forms the basis for a ball and ratchet clutch 21. A ring-shaped disc 22 is secured on the upper side, said disc having a plurality of depressions (FIG. 11), here six, as seats for a corresponding number of balls 23 disposed in through bores in a ring 24, whose thickness is slightly smaller than the diameter of the balls so that these protrude slightly on both sides of the ring. This ring 24 is secured on a tubular shaft member 25 which, with one end, is seated inwardly over a hub 26 on the orbital wheel 20. A loose ring-shaped disc 27, likewise with depressions for the balls, is provided on top of the balls. The balls are kept in engagement with the two ring-shaped discs 22, 27 by means of a spring force, here in the form of two disc springs 28, which extend toward the ceiling in an overlying cap 29 which is fixed with the sides to the outer side of the orbital wheel 20. For this purpose, the orbital wheel is provided with an annular groove. The cap is pressed by a predetermined pressure down over the orbital wheel to bias the disc springs 28. When the determined pressure is achieved, the side wall of the cap is deformed locally into the groove of the orbital wheel for mutual locking of these with each other. This ensures, in a simple manner, a well-defined maximum torque for the overload clutch independently of manufacturing tolerances of the constituent parts. Under normal conditions of operation, the torque is transferred from the planetary gear via the engagement of the balls with the two ring-shaped discs. When the maximally permissible torque is reached, the balls 23 are forced against the spring force 28 out of their seats in the ring 22 on the orbital wheel 20, and the connection is interrupted with generation of strong noise as the balls jump into and out of their seats. When the torque drops below the maximally permissible torque, the balls settle again in the seats.

The overload clutch 21 appears as a finished unit (FIGS. 4 and 11) which is applied inwardly over the tubular shaft 14 on the bracket 13 to the front end of the motor and is secured with a screw 30 and a washer in engagement with an internal shoulder in the shaft. The planetary wheels 19 with the obliquely toothed wheels 18 in engagement with the sun wheel 17 are likewise secured on the bracket, there being holes in two opposed walls for stub shafts for the wheels. A gear wheel 31 is secured to the tubular shaft 14 for the further transmission to the spindle 4.

Figure 4A:
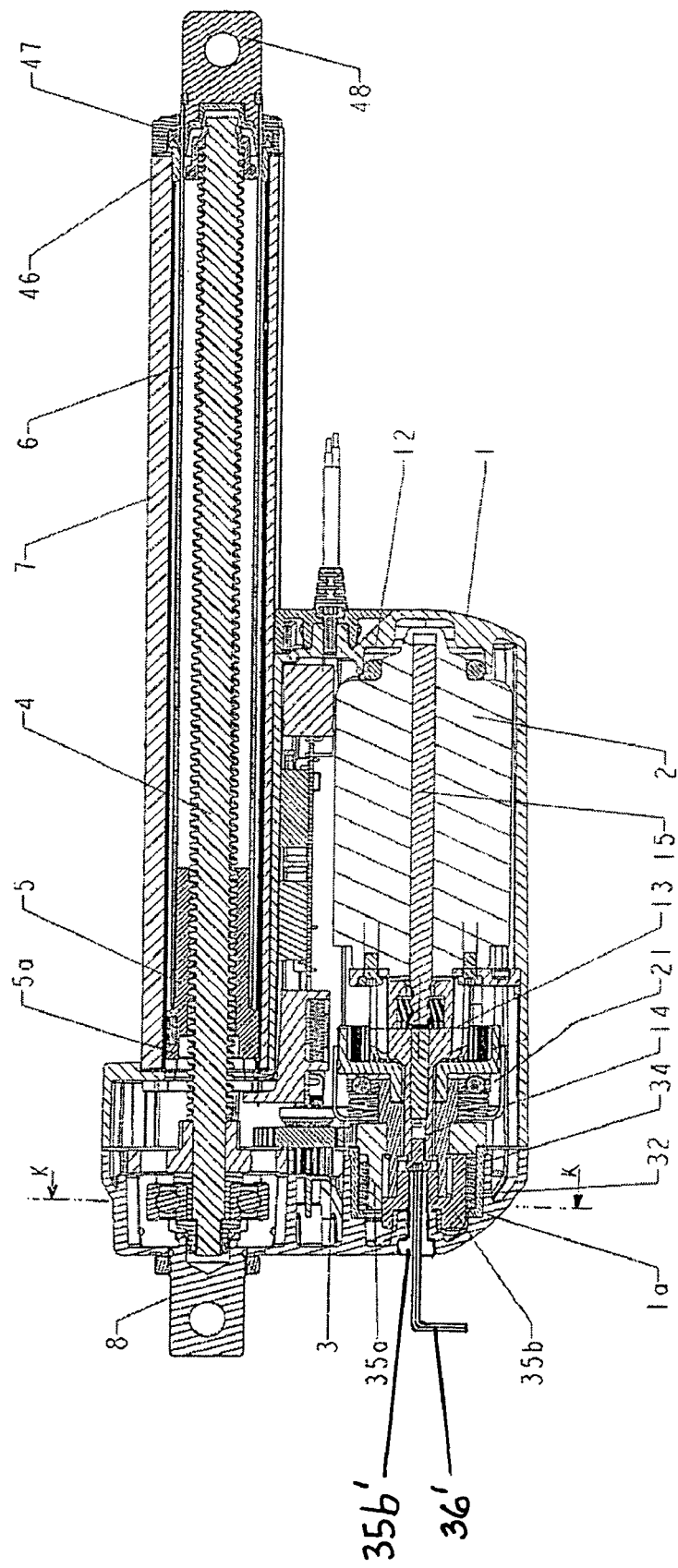
FIG. 4a shows the same longitudinal section as in FIG. 4 but wherein an Allen screw is used to rotate the claw part of the claw clutch.
Figure 7:
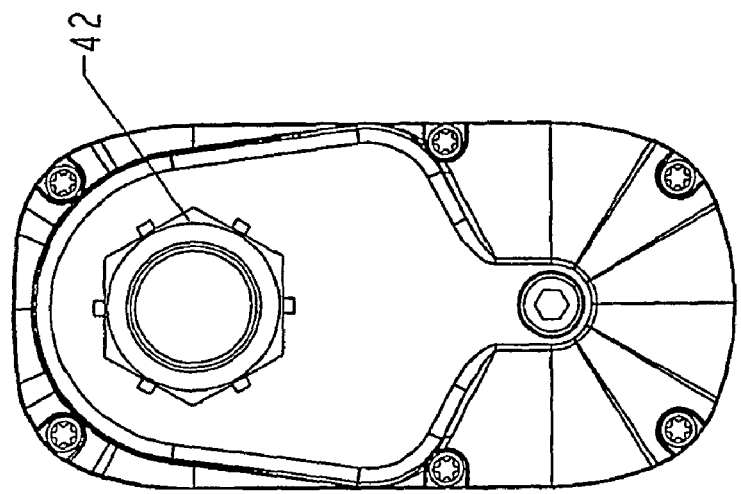
FIG. 7 shows the actuator seen directly from behind.
Figure 6:
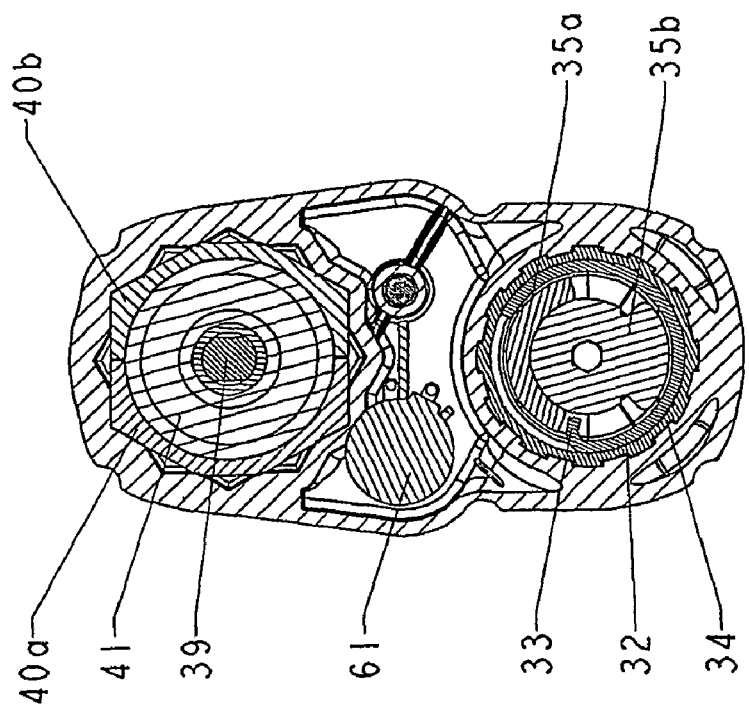
FIG. 6 shows a cross-section along the line K-K in FIG. 4.
Figure 5:
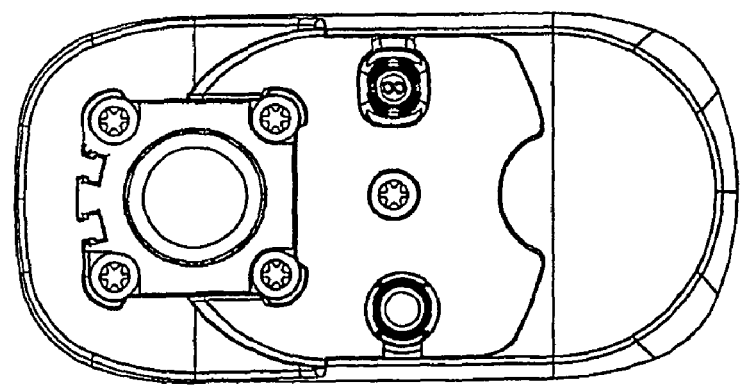
FIG. 5 shows the actuator seen directly from the front.

For spindle types which themselves are not self-blocking, such as ball spindles and spindles with acme threads having a great pitch, or if so needed, the actuator may be equipped with a brake based on a screw spring 32 with inwardly bent ends 33 (FIGS. 4 and 6). The spring extends out to the side wall in a cylindrical insert 34 in the housing. The brake effect is a consequence of friction between the outer side of the spring and the cylindrical wall against which the spring is fixed. A first part 35a of a claw clutch is mounted on the side of the mentioned gear wheel 31 on the bracket shaft and may be engaged with one spring end 33. The part has two knobs which are seated in holes in the side of the gear wheel 31. The other part 35b of the claw clutch has a tubular part which is seated in the end of the tubular shaft 14 from the overload clutch and is secured with a splined connection. When the motor is active, the one claw part 35b rotates into engagement with the spring end 33 closest to the rear end of the actuator and contracts the spring, whereby it is disengaged from the side wall, and the actuator may thereby run freely. When the motor stands still, the spring 32, owing to its bias against the side wall, causes braking. If the spindle 4, because of a great load thereon, applies a torque to the first claw part 35a, then this rotates into contact with the spring end closest to the overload clutch and thereby fixes the spring 32 additionally against the side wall and increases the braking force.

Where it is desired to drive the actuator manually, e.g., because of repair of the structure in which the actuator is incorporated, adjustment or general power failure, then the actuator may be driven manually. For this purpose, a screw 36 in the cabinet is removed, which gives access to the other claw part 35b (FIG. 4a). The screw is an Allen screw, and the same Allen key 36' as is to be used for the screw, fits in a central hexagonal hole 35b' in the claw part 35b. When the claw part is rotated by the Allen key, the brake spring 32 is loosened, and the actuator may be rotated by the key.

A gear wheel train, which may be adapted to specific wishes, extends from the overload clutch. The gear wheel 31 on the bracket shaft 25 is currently in engagement with another gear wheel 37 on the side of which a smaller gear wheel is provided, which, in turn, is in engagement with a larger gear wheel 38 mounted with a double D-groove connection 39 on the shaft of the spindle. The motor has a number of revolutions of the order of 3000 rpm./min., and the gearing up to and including the planetary gear is of the order of 15. The gearing of the gear wheel train may be changed freely within the given framework. If a great maximum load is desired, the gear wheel train may e.g. be provided with a gearing of the order of 3, which corresponds to a maximum load of the order of 7000 N. In case of smaller loads, the gear wheel train may e.g. be provided with a gearing of the order of 1, which corresponds to a maximum load of the order of 2500 N. The total gearing will thus be of the order of 45 down to 15. With a spindle pitch of 12 mm and the stated motor speeds, this gives a speed of the inner pipe of 800 mm/sec. to 2400 mm/sec.

Figure 3:
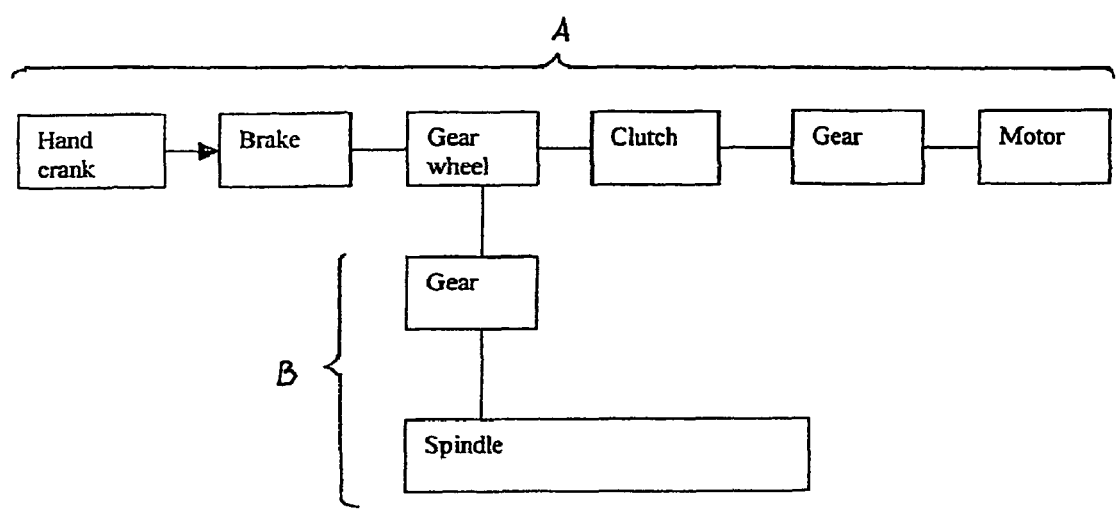
FIG. 3 shows a sketch of the basic structure of the actuator.

FIG. 3 of the drawing shows the basic structure of the actuator. The part A is applied as a standard unit, as mentioned, while the part B may be adapted to customer-specific wishes.

Figure 11:
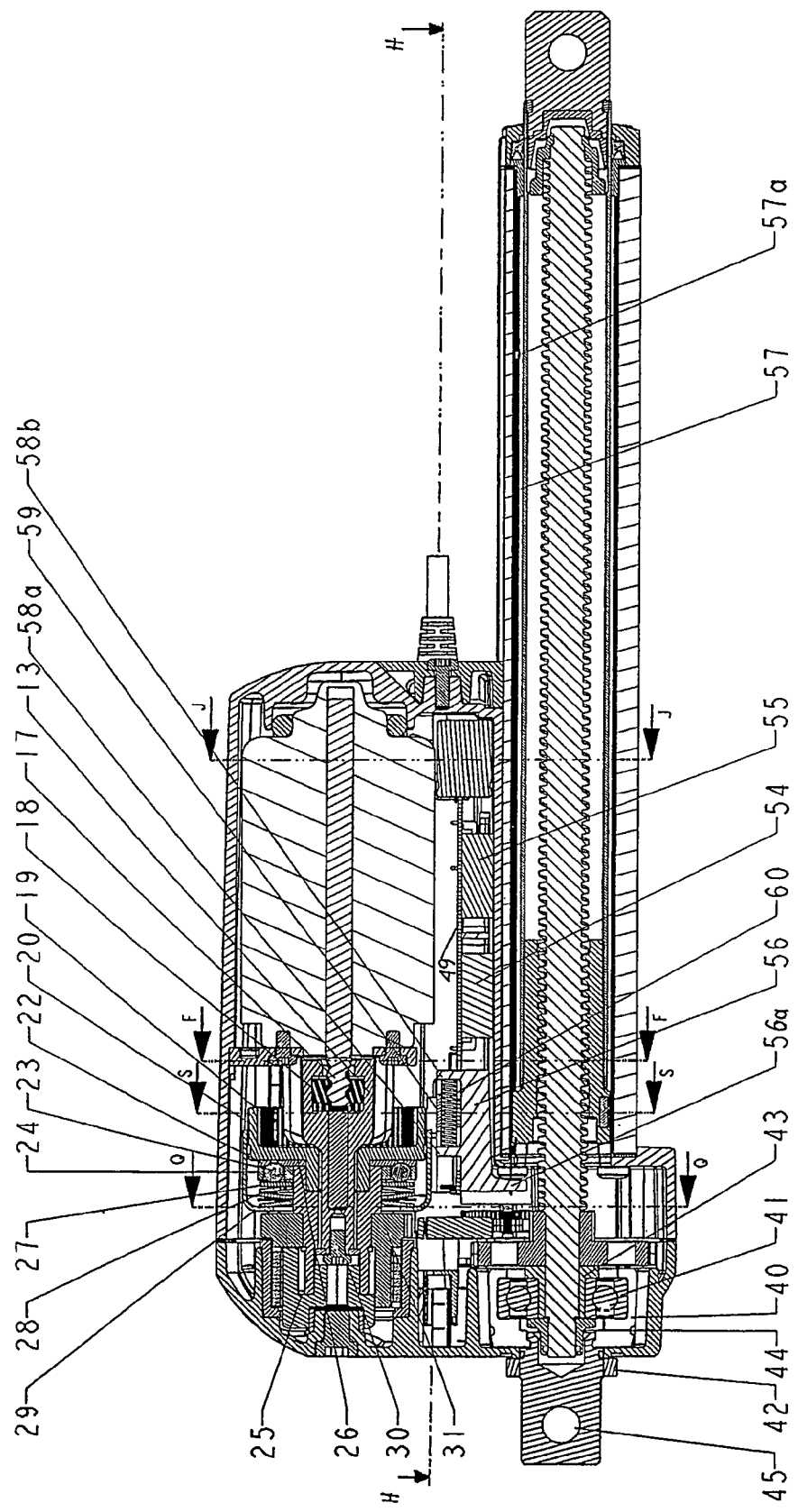
FIG. 11 shows a longitudinal section through the actuator.

The end of the rear mount 8 of the actuator, which is seated in the cabinet, is mounted in a mounting element 40 of hexagonal cross-section which is received in a corresponding recess in the end cover of the cabinet (FIGS. 6 and 11). The rear mount may thus be rotated in steps of 30° for adaptation of its position to the structure in which the actuator is incorporated. The mounting element consists of two parts 40a, 40b which are assembled around the rear mount 8 which is secured in that a flange on the element 40 engages a groove in the rear mount. The element 40 also includes a seat for a ball bearing 41 secured via a bushing on the shaft of the spindle. The bearing is secured against a breast on the bushing 43 and a head 44 mounted on the outer end of the shaft. The mounting element 40 with the spindle unit 4 is secured to the cover 1a by a nut 42 on the part of the rear mount which protrudes from it and is fixed against the outer side of the cover. The rear mount 8 has a cylinder element with an eye 45, but it will be appreciated that the actuator may be provided with customer-specific rear mounts.

Figure 15:
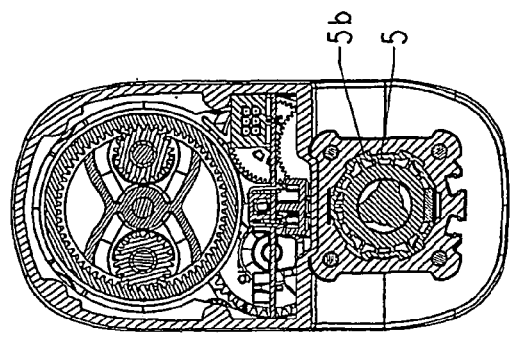
FIG. 15 shows a cross-section along the line S-S in FIG. 11.
Figure 14:
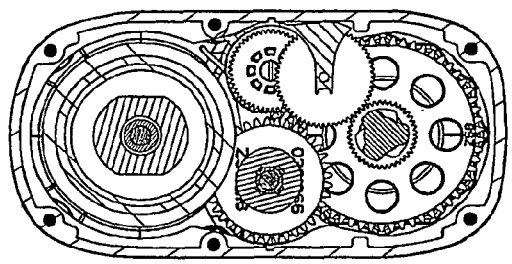
FIG. 14 shows a cross-section along the line Q-Q FIG. 11.
Figure 13:
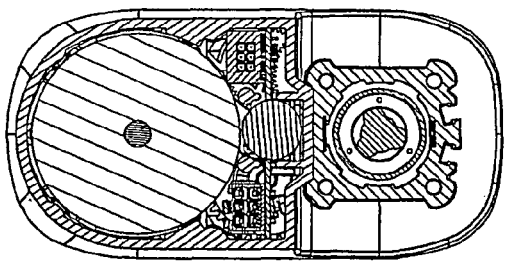
FIG. 13 shows a cross-section along the line J-J in FIG. 11.
Figure 12:
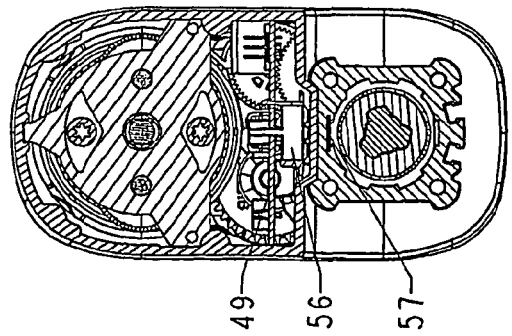
FIG. 12 shows a cross-section along the line F-F FIG. 11.

As mentioned before, the outer pipe 7 is an aluminium profile having an external square cross-section and a circular internal cross-section which encloses the spindle 4 and the inner pipe 6 (FIG. 4). The spindle nut 5 is mounted on the end of the inner pipe 6 facing the actuator; the spindle nut is of plastics and may be provided with a safety nut of metal mounted in a recess in the end of the spindle element and secured by tearable elements which are torn if the spindle nut fails, whereby the safety nut takes over the load. The end of the spindle 5 protruding rearwardly from the inner pipe 6 is constructed as a guide bushing 5a which guides toward the inner side of the outer pipe 7. To rotationally secure the spindle nut 5, the part 5a of the nut is provided with four bosses 5b which are seated in grooves in the outer pipe 7 intended for the purpose (FIG. 15). Further, a guide bushing 46, toward which the inner pipe 6 guides, is likewise provided at the end of the outer pipe 7 facing away from the actuator. Finally, an end cover containing a sealing ring with lip sealing for the inner pipe is screwed on to the outer pipe. As an extra safeguard, a mechanical stop, a buffer, in the form of a ring is secured to the outer end of the spindle 4 in the event that the end stop should fail. A mount 48 is secured in the end of the inner pipe 6, with a shaft part inserted therein, whereby the inner pipe may be secured to the structure in which the actuator is to be incorporated. The mount is configured here as a piston rod eye, but it may be adapted to customer-specific wishes, of course.

Figure 16:
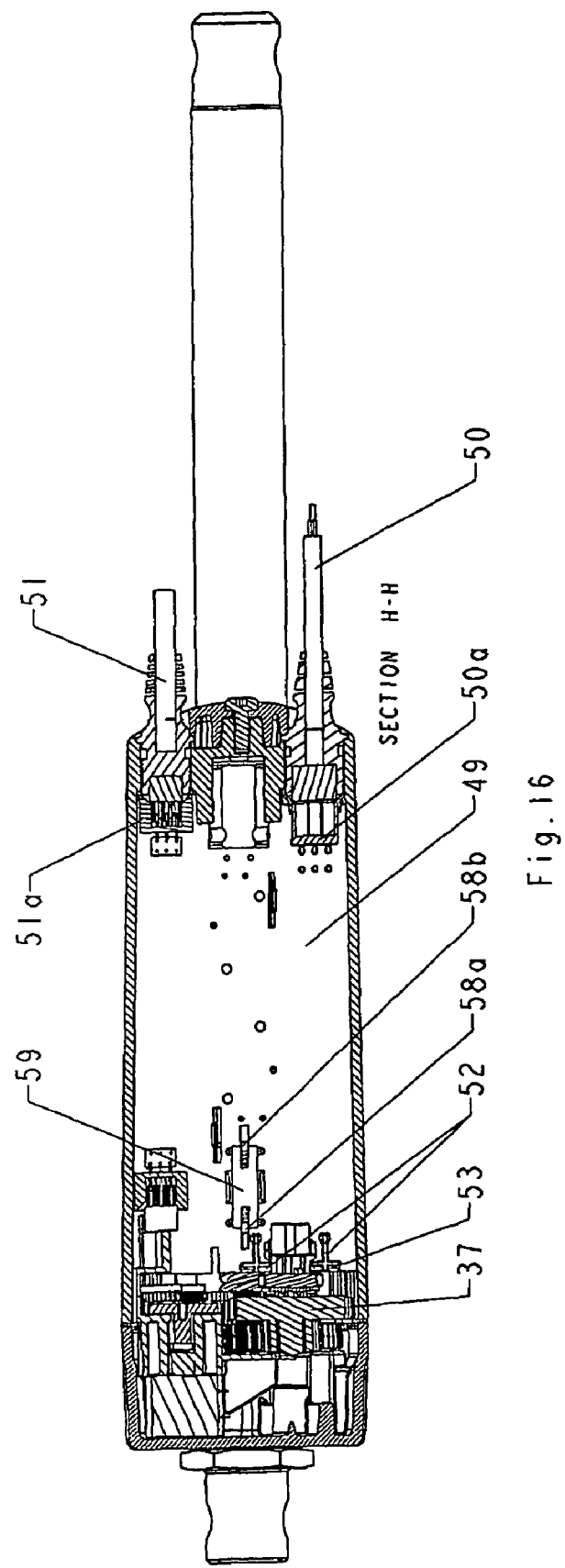
FIG. 16 shows the actuator seen from above with a longitudinal section along the line H-H in FIG. 11.
Figure 17:
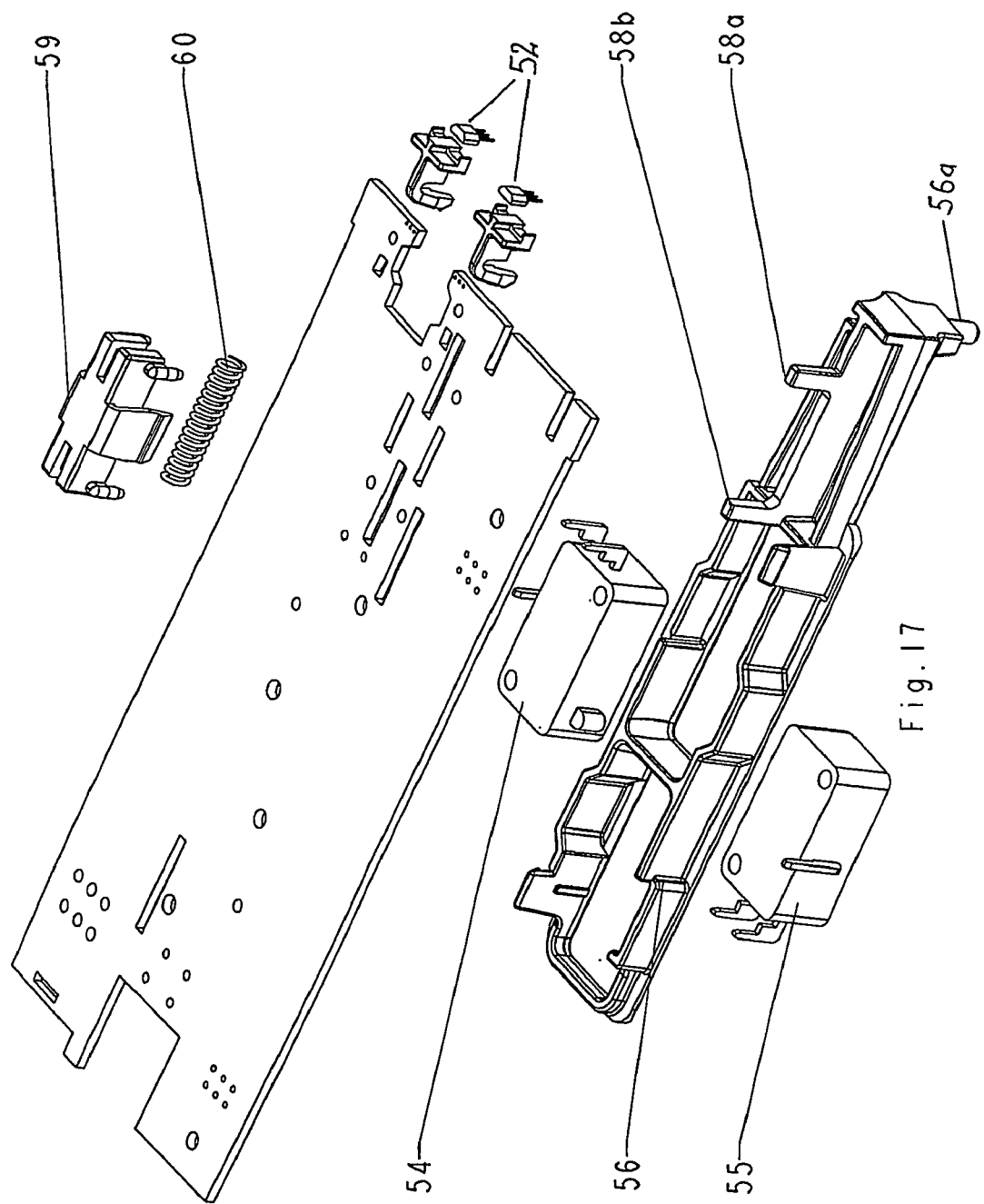
FIG. 17 shows an exploded view of the printed circuit control board.

A CS printed circuit board 49 with all the components and circuits necessary for the control of the actuator is inserted into the cabinet 1 below the motor 2 (FIG. 11). The CS printed circuit board is arranged such that the actuator may run an DC as well as an AC power supply positioned outside the actuator. A bridge having four FET transistors is used for reversing the direction of rotation of the motor rather than mechanically operating relays like before. The CS printed circuit board extends to the front end of the cabinet which has a gate at each side for a cable 50, 51 (FIG. 16). In connection with the gates, the CS printed circuit board has a plug 50a, 51a for the cables. The one cable 50 is a power supply cable, while the other 51 is a control cable, e.g. for a manual control or for a PLC control. The position of the inner pipe 6 is determined by two Hall sensors 52 arranged at the rear edge of the CS printed circuit board, which is activated by a multi-polar magnet 53 arranged on the side of the gear wheel 37. The end stop positions of the inner pipe are determined by means of two end stop switches 54, 55 mounted on the CS printed circuit board. A slide element 56 is arranged around the switches, which are rectangular, said slide element being provided with two frame-shaped openings which guide toward the side of the switches, and which activate these in specific positions (FIGS. 11 and 17). The slide has an angular leg 56a which extends down behind the spindle nut 5. When the spindle nut is in its innermost position, it hits the leg 56a with the rear edge and pulls the slide 56 along to activate the respective switch 54 to interrupt the power to the motor. Further, an elongate plate-shaped rod 57 is secured with one end to the leg, guided in a groove internally in the outer pipe 7 and moved to the front end thereof, said rod having a flap 57a which extends down in front of a collar on the spindle nut 5. In the outer position, the collar hits the flap and pulls the rod and thereby the slide element along to activate the other switch 55, thereby interrupting the power to the motor. The slide element 56 is kept in a neutral position in that it has two fingers 58a, 58b which extend through a slot in the CS printed circuit board, on whose other side an elongate housing 59 is mounted, in which a slightly biased helical spring 60 is mounted between the ends. A slot is provided at both ends of the housing for the fingers of the slide element which engage the ends of the spring. The slide element is thereby kept in a neutral position by a single helical spring. When the slide element 56 is moved toward the rear end of the actuator, the spring 60 is compressed against the rear end of the housing by the finger 58b farthest off at the front end of the actuator, while the finger 58a farthest off at the rear end of the actuator is displaced in its slot away from the housing 59. At reversing, i.e. when the spindle nut 5 leaves its innermost end position and runs outwards, the spring tension ensures that the slide element 56 assumes a neutral position, and since the spring 60 is biased, the neutral position is determined uniquely. The same happens at the other switch 55 when the spindle nut 5 is in its outer position.

Figure 18:
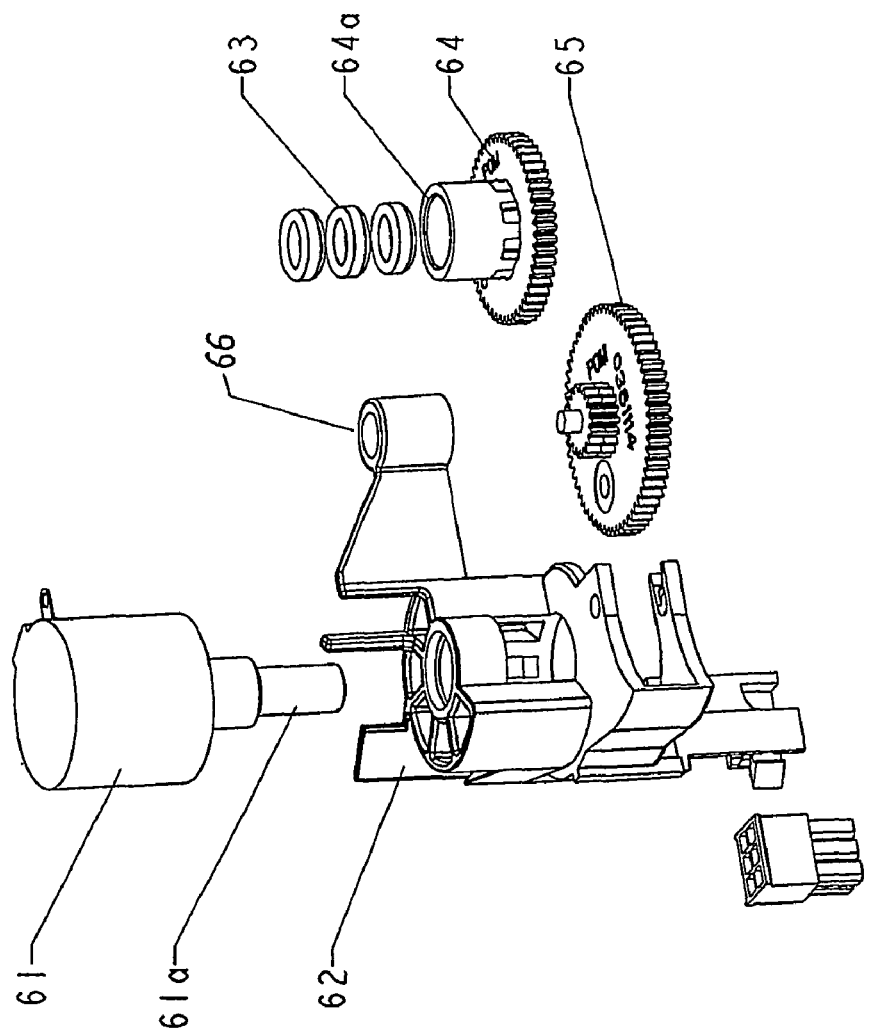
FIG. 18 shows an exploded view of the potentiometer unit.

Instead of Hall sensors, the actuator may be provided with a potentiometer 61 for absolute positional determination of the position of the inner pipe (FIG. 18). This potentiometer is configured as an add-on unit which may be secured with a bushing 66 on a shaft member on the bracket on the front end of the motor. The potentiometer unit is constructed on a chassis 62 with a gearing, where the potentiometer with its rotary shaft 61a is moved via two O-rings 63 into a tubular shaft member 64a on a gear wheel 64. When the potentiometer reaches its outer positions, the O-rings serves as a slip clutch. The last gear wheel 65 in the gearing is in engagement with a gear wheel provided integrally with the gear wheel 37 which drives the gear wheel on the spindle.

An actuator has been described above where a tubular spindle rod guided in a guide profile is secured to the spindle nut. It will be appreciated that the actuator may alternatively be constructed without a piston rod, but where the nut is secured to the structure in which the actuator is incorporated, as is known e.g. from DK 174 457 B1 to Linak A/S.

The invention claimed is:

1. A linear actuator comprising
   a) a cabinet having
   b) a reversible electric motor with a motor shaft mounting a sun wheel,
   c) a reduction gear with several stages, where a first stage with an input side is connected with the motor shaft, said first stage comprising a pair of gear wheels, engaged with said sun wheel, said gear wheels rotating planetary wheels engaged with an orbital wheel,
   d) a spindle whose one end is connected with an output side on a last stage in the reduction gear, and an opposite end of the spindle indicates the front end of the actuator,
   e) a spindle nut secured against rotation on the spindle such that this is moved to and fro on the spindle in response to the current direction of rotation of the motor, and wherein the spindle nut may be secured indirectly or directly to the structure in which the actuator is incorporated,
   f) a rear mount at a rear end of the actuator likewise for attachment of the actuator in the structure in which the actuator is to be incorporated, and
   g) a ball and ratchet overload clutch which is released at a predetermined torque, wherein the overload clutch is directly connected to the orbital wheel.

2. The actuator according to claim 1, wherein the over-load clutch is formed by a ball and ratchet clutch comprising a ring with holes for the balls, and wherein the balls on that side are in engagement with depressions in a first plate firmly connected with the transmission from the motor, and on the other side are in engagement with depressions in a second plate member, wherein a spring mounted against the ceiling in a cap keeps the plate member and thereby the balls in engagement, and wherein the cap is secured by a predetermined force directly or indirectly to the first plate member, and wherein the ring with the balls is connected with the further transmission to the spindle.

3. The actuator according to claim 2, wherein the ring with the balls is connected with a shaft member with a gear wheel as a transition to the subsequent stages in the gearing to the spindle.

4. The actuator according to claim 3, wherein the shaft member is connected with a brake device to increase the self-blocking capacity of the actuator.

5. The actuator according to claim 2, wherein an end of a shaft member or an extension thereof is configured to receive a crank through an opening in the cabinet for manual operation of the actuator.

6. The actuator according to claim 1, wherein the rear mount and a bearing for the spindle are secured in a mounting element consisting of two parts mounted in a depression in the cabinet and secured with a nut screwed on to the part of the rear mount which protrudes through the cabinet.

7. The actuator according to claim 1, wherein a guide profile for an activation element, in addition to being secured with the end to the cabinet, is additionally attached to the cabinet with two claws which grip down around the edge on the outer side of the guide profile.

8. The actuator according to claim 1, wherein an electrical control for the actuator is incorporated in the cabinet.

9. The actuator according to claim 1, wherein the end stop positions of the spindle nut are controlled by two electrical switches which are activated by a longitudinally movable element with two arms seated in a slot in a housing, said arms having interposed between them a spring whose ends additionally engage a stop in the housing.

10. The actuator according to claim 7, wherein the position of the activation element is determined with a potentiometer constructed as an add-on unit in engagement with down gearing between a safety clutch and the spindle.

* * * * *